United States Patent [19]

Houle

[11] 3,911,652

[45] Oct. 14, 1975

[54] SAFETY BLADE FOR ROTARY LAWN MOWERS

[76] Inventor: Elmer R. Houle, 2221 N. 40th St., Phoenix, Ariz. 85008

[22] Filed: Jan. 11, 1974

[21] Appl. No.: 432,663

[52] U.S. Cl. .................................. 56/295; 56/295
[51] Int. Cl.² ...................................... A01D 55/18
[58] Field of Search .................... 56/295; 76/101 R

[56] References Cited
UNITED STATES PATENTS

| | | | |
|---|---|---|---|
| 3,302,377 | 2/1967 | Ely | 56/295 |
| 3,340,682 | 9/1967 | Ely | 56/295 |
| 3,402,542 | 9/1968 | Johnston | 56/295 X |
| 3,465,508 | 9/1969 | Edwards | 56/295 |
| 3,516,236 | 6/1970 | Freedlander et al. | 56/295 |
| 3,545,189 | 12/1970 | Gillaspie et al. | 56/295 |

Primary Examiner—J. N. Eskovitz

[57] ABSTRACT

An improvement over a safety blade for rotary lawn mowers as disclosed in U.S. Pat. No. 3,545,189 comprising a blade assembly having a rigid metal member encapsulated in alternate layers of bonding rubber and high tensil fabric material and where the bonding layers and fabric material extend beyond opposite ends of the metal layer and wherein the metal layer is completely encapsulated by the rubber-like bonding material and the high tensil fabric material of the assembly. The disclosure also relating to a method of producing the blade assembly and to indicia molded on the blade assembly relating to precise cut off positions for cutting opposite ends of the blade assembly away to match the diametrical dimensions of various rotary lawn mowers.

9 Claims, 9 Drawing Figures

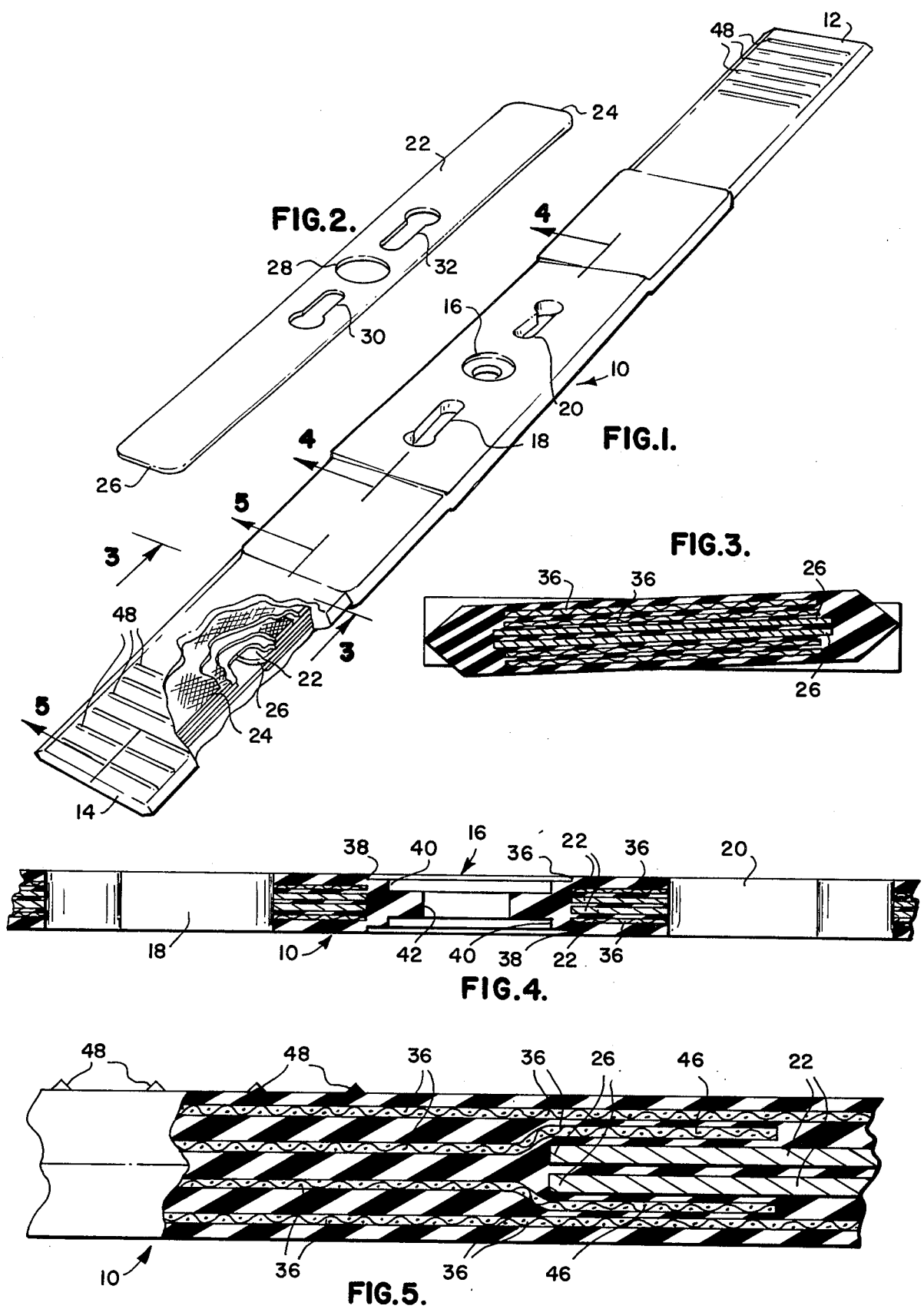

SAFETY BLADE FOR ROTARY LAWN MOWERS

BACKGROUND OF THE INVENTION

The prior art as disclosed in U.S. Pat. No. 3,545,189 comprises a flexible blade assembly in which outer extremities of the assembly are made of high tensil fabric such as nylon bonded with a rubber-like material and wherein the hub area is provided with a pair of rigid metal clamping plates clamped to the upper and lower sides of the flexible portion of the blade assembly by rivets or other suitable means. The foregoing structure disclosed in U.S. Pat. No. 3,545,189 has been successful to a great degree in providing relative safety in the operation of convention rotary lawn mowers. However, the clamp plates designated 18 and 20 in the drawings of said patent are metal plates and are disposed on the upper and lower surfaces of the prior art assembly and have heretofore tended to catch solid objects such as rocks or the like and have caused them to be propelled in an undesirable fashion; it being noticed that the radius of the plates 18 and 20 have been nominal and this, however, still contributes to the possibilities that the metal plates will provide a solid propulsion means for rocks and other objects which are encountered below a rotary lawn mower. The extending portions 54 and 56 of the prior art blade structure shown in said patent have provided great safety features which have prevented the cutting of persons' feet and have prevented the solid propulsion of rocks or of other dangerous objects when contacted in the grass being mowed.

SUMMARY OF THE INVENTION

The present invention relates to an improved safety blade for rotary lawn mowers wherein the rigid structure of the blade is all encapsulated in rubber-like bonding material such that the entire outer surfaces of the improved blade assembly are relative soft compared to the usual steel structures of conventional blades and also relative to the steel clamping plates of the hereinbefore described prior art. The present invention comprises a completely molded blade assembly produced in accordance with a novel method for manufacturing lawn mower blades wherein layers of fabric and rubber-like bonding layers are alternately laid adjacent to each other at opposite sides of a carburized steel member of substantial rigidity and all of the layers, including the metal layer, are placed in a mold and subjected to heat and pressure to completely encapsulate the metal layer and to provide for complete surrounding thereof with relatively soft and resilient material which tends to minimize the propulsion of rocks or other objects from a rotary lawn mower and which also tend to minimize the possibility of any damage to the operator in case the operator foot or hand may contact the improved blade during rotation thereof.

The invention comprises a completely molded blade assembly having outer ends portions provided with graduation indicia in terms of inches or half inches or any portions therof as desired, so that the assembly may be made long enough from end to end to match the overall diametrical measurements of large rotary mowers and whereby incremental portions of opposite ends of the blade assembly may be cut away preliminary to installation to match rotary mowers of relatively smaller diametrical dimensions. Accordingly, the invention comprises the production molding of a safety blade for rotary lawn mowers which is universally adapted to any and all rotary lawn mowers.

The rigid metal layer encapsulated in the fabric and rubber-like material of the assembly, is preferably a carburized steel blade having brittle characteristics adapted to fracture and break at its middle portion in the area of an opening therein which receives a motor driven shaft. Thus, the rigid metal member, when subjected to a substantial amount of shock as the blade assembly hits a large rock or other heavy or rigid object, allows the blade to break at the middle of its rigid metal member and to fold at its middle portion and to thereby prevent damage to the lawn mower engine such as the usual damage which occurs to the shaft thereof. Such damage usually comprising the bending of the motor shaft and thereby causing subsequent operation of the mower to result in virbration of extreme amplitude which soon ruins the bearings of the engine. Accordingly, the safety blade of the present invention alliviates such problems by means of its brittle carburized metal layer which breaks upon heavy impact with a solid object.

Accordingly it is an object of the present invention to provide an improved safety blade for rotary lawn mowers wherein a metal member is completely encapsulated in rubber-like and fabric layers, thereby providing an entier outer surface of the blade which is substantially soft and resilient as compared to the usual rigid blades, and also as compared to rigid outer clamping plates of prior art safety blades.

Another object of the invention is to provide a novel safety blade for rotary lawn mowers which comprises a novel structure as well as a novel method for laying and bond layers of fabric and rubber-like bonding material together with a rigid metal member in a mold wherein heat and pressure vulcanizes all of the layers together and thereby encapsulating a rigid metal member therein.

Another object of the invention is to provide a safety blade for rotary lawn mowers which provides safety for rotary lawn mower operators as well as safety for the engine and its shaft which drives the safety blade of the invention.

Another object of the invention is to provide a safety blade for rotary lawn mowers which may be economically produced and which is very efficient and durable in operation.

Further objects and advantages of the invention may be apparent from the following specification, appended claims and accompanying drawings.

BRIEF DESCRIPTION OF THE DRAWINGS

FIG. 1 is a perspective view of a safety blade for rotary lawn mowers in accordance with the present invention, and showing portions thereof broken away and in section to amplify the illustration;

FIG. 2 is a perspective view of a rigid metal layer which encapsulated in the safety blade assembly of the invention;

FIG. 3 is an enlarged sectional view taken from the line 33 of FIG. 1;

FIG. 4 is an enlarged sectional view taken from the line 44 of FIG. 1;

FIG. 5 is an enlarged fragmentary sectional view taken from the line 55 of FIG. 1;

DESCRIPTION OF THE PREFERRED EMBODIMENTS

Figure 6:
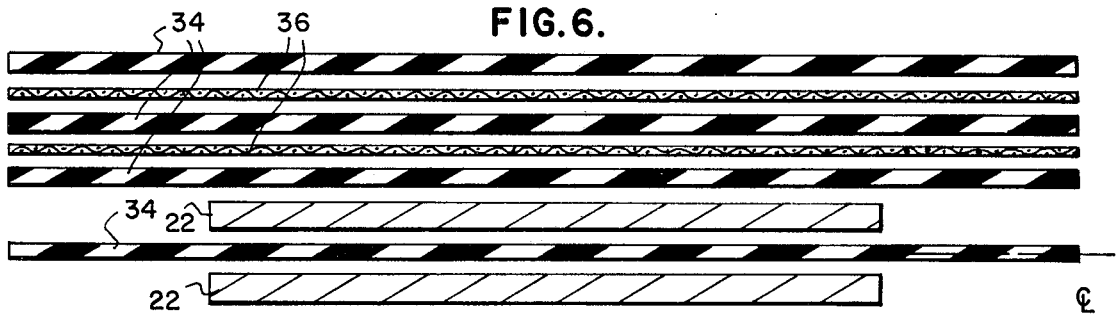
FIG. 6 is a diagramatic view of the manner in which layers of fabric, rubber-like bonding layers and rigid metal layers are assembled and placed in a mold wherein they are subjected to heat and pressure for vulcanizing all of the layers into a unitary assembly wherein the metal layers are encapsulated in the fabric and rubber-like structure of the blade assembly.

As shown in FIG. 1 of the drawings, the blade assembly of the invention is designated 10 and it is provided with opposite ends 12 and 14 and a middle area having a shaft receiving opening 16 therein.

Additionally, openings 18 and 20 are adapted for receiving dowels or bolts for attachment to driving mechanism in connection with the shaft of the rotary lawn mower to prevent the blade assembly from rotating relative to the motor driven shaft which is disposed in the opening 16, the details of which will be hereinafter described.

The blade assembly 10 as shown in FIG. 1, comprises a rigid metal layer 22 which is encapsulated in layers of fabric 24 and alternate layers of rubber-like bonding material as will be hereinafter described.

The rigid metal layer 22 is provided with opposite ends 24 and 26 and is provided with a middle opening 28 adapted to receive an engine shaft and is also provided with fixture receiving openings 30 and 32 corresponding with the openings 18 and 20 in the assembly as shown in FIG. 1.

It will be seen that the end 26 of the metal layer 22 is spaced from the end 14 of the blade assembly which comprises fabric and rubber-like material extending beyond the end 26 of the metal layer 22 out to the end 14 of the blade assembly. The opposite end 12 of the blade assembly is also spaced in a similar manner from the end 24 of the metal layer 22, all as will be hereinafter described in detail.

Referring briefly to FIG. 6 of the drawings, it will be seen that the structure of the blade is shown on an enlarged scale and FIG. 6 is a diagramatic view showing an example of the manner in which the layers are preliminarily laid up before the structure is molded into a unitary assembly as shown in FIG. 1. In FIG. 6, alternate layers of rubber-like bonding material 34 are disposed at opposite sides of fabric layers 36 and one of the rubber-like bonding layers is disposed adjacent to a rigid metal layer 26, it being noted that only one layer 26 may be used or a pair of the layers 26 may be used, these being rigid metal layers preferably carburized steel having brittle character.

On each side of each steel member one of the rubber-like bonding layers 34 is disposed and it will understood that FIG. 6 diagramatically shows a center line which would be a middle of a blade assembly wherein two of the metal layers are disposed and accordingly, the lower most metal layer 26 shown in FIG. 6 would be adjacent to alternate rubber-like bonded layers 34 and fabric layers 36 which are shown adjacent to the upper most metal layer in FIG. 6 of the drawings. This general combination of structure is seen in the disclosure of FIG. 3 of the drawings, wherein two metal layers 26 are disclosed. However, the rubber-like bonding layers have been heated and caused to be vulcanzied. Accordingly, the method of the invention as will be hereinafter described, has caused these rubber-like layers to flow into the general shape shown in FIG. 3 of the drawings. It will be seen that the fabric layers 36 extend near to the ends 12 and 14 of the assembly and, of course, the rubber-like bonding layers when caused to flow under heat and pressure are molded into the shape generally disclosed in FIGS. 1 to 5 of the drawings.

The shaft receiving opening 16 is molded with a large diameter portion 38, a next smaller diameter portion 40, and a minor diameter portion 42, so that portions may be knocked out to accomodate the diameter of various shafts. For example, the portion between the opening 42 and the diametrical portion 40 may be knocked out to receive a shaft of larger diameter than that which would be accomodated by the diameter of the opening 42 and additionally, the space between the annular area 38 and the annular area 40 may be knocked out to accomodate an even larger shaft. Thus the blade assembly shown in FIG. 1, may be adapted readily by the purchaser to fit various sized motor driven lawn mower shafts.

Additionally, the openings 18 and 20 shown in FIG. 4, extend all the way through the blade assembly form side to side.

It will be noted that the sectional view of FIG. 4 discloses only two layers of fabric 36 near the middle area of the blade assembly, while the disclosure in FIG. 3 discloses four layers of fabric 36 which are disposed in the outer flexible portion of the blade near the end of the metal layer and there beyond. This structure being shown in FIG. 5, wherein a pair of the fabric layers 36 are provided with overlapping portions 46 which overlap the ends 26 of the rigid metal layers 22. These portions 46 overlap the ends 26 of the metal layers 22 for about an inch and are bonded thereto by intermediate layers of the rubber-like bonding material 34, all as indicated in FIGS. 3, 5 and 6 of the drawings.

Near the opposite ends 12 and 14 the blade assembly is provided with slightly raised ridge portions 48, which are molded as indicia lines graduated in increments of an inch so as to indicate the length at which the ends should be cut off for mowers operating on a nominal radius while the largest mower may be accomodated by the blade as shown wherein opposite ends 12 and 14 are at maximum length. These graduations 48 are marked numerically in inches so that each end may be cut off correspondingly if the blade is to be used on an intermediate or small radius rotary mower.

In accordance with the method of the invention, the layers of rubber-like bonding material 34 and the fabric layers 36 as well as the metal layers 22, are laid up substantially are hereinbefore described, and placed in a mold 50 having seperable portions 52 and 54 which are provided with corresponding cavity portions 56 and 58. The mold portions 50 and 54 are forced together in accordance with the direction of the arrows A and B or one mold is forced towards the other in the same relative relationship. In the cavity portions 56 and 58 all of the layers hereinbefore described in connection with FIG. 6 are placed under heat and pressure to finally form the blade assembly as shown in FIGS. 1, to 5 of the drawings, wherein all of the layers of fabric and the metal layers are vulcanized together by the rubber-like bonding layers which flow in conformity to the features of the mold.

Figure 7:
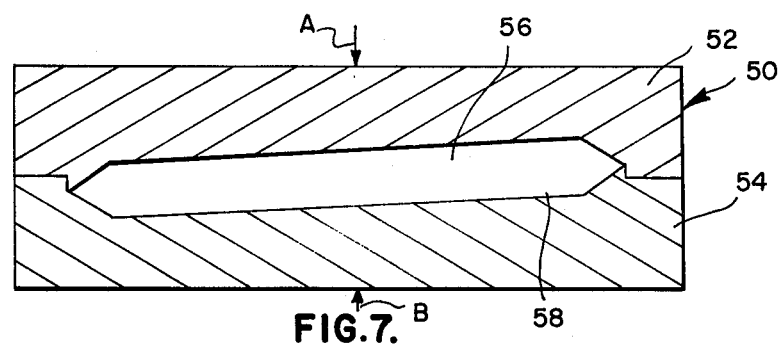
FIG. 7 is a sectional view of a mold used in accordance with the method of the invention to produce the blade assembly of the invention, the section view of the mold in FIG. 7 being taken on a plan similar to that of FIG. 3 of the drawings.
Figure 8:
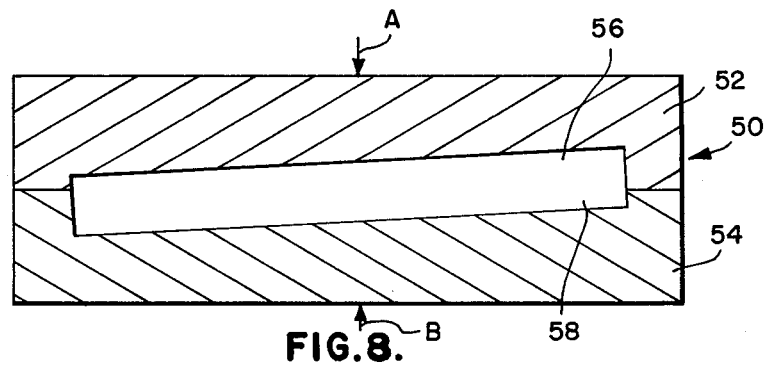
FIG. 8 is another sectional view similar to FIG. 7 showing an area of the mold corresponding to a position between the structure shown in FIG. 3 and the middle area of the blade assembly.

The portion of the mold as shown in FIG. 7 corresponds to the cross-sectional portion of the blade assembly as shown in FIG. 3 near both opposite ends 12 and 14. The mold 50 has a cross-section as shown in FIG. 8 which corresponds to an area of the blade assembly between that area disclosed in FIG. 3 of the drawings and the middle area in which the openings 18 and 20 are located.

Figure 9:
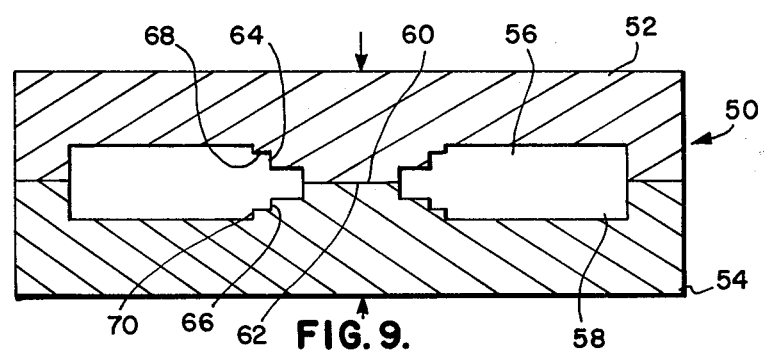
FIG. 9 is another sectional view of the mold used with the method of the invention and this sectional view is taken in area of the mold corresponding with the central or middle portion of the blade wherein the shaft opening is molded.

The mold 50 as shown in FIG. 9 the drawings, is the middle portion of the mold corresponding to the area wherein the shaft receiving opening 16 is located in the blade assembly as shown in FIG. 1.

The mold cavity portions 56 and 58 are provided with annular protuberances 60 and 62 respectively, and these protuberances are adapted to form the opening 42 disclosed FIG. 4 of the drawings while stepped protuberances 64 and 66 of annular form are concentric with the protuberances 60 and 62 form the annular stepped portion 40 in the central opening 16 of the blade assembly. Likewise, annular protuberances 68 and 70 in the mold 50 form the annular opening portion 38 of the opening 16 as shown in FIG. 4 of the drawings.

It will be appreciated by those skilled in the art that the molding of these stepped diameter portions in the shaft receiving openings 16 provide for knock out operations to be performed on any of the annular portions beyond the diameter of the opening 42 for accomodating larger shafts than that which might be fitted into the opening 42, all as hereinbefore described.

It will be obvious to those skilled in the art that various modifications of the invention may be resorted to without departing from the spirit of the invention.

I claim:

1. In a safety blade for rotary lawn mowers, the combination of: a blade assembly having opposite ends and a middle portion; said middle portion having a shaft receiving opening adapted to be disposed over and fixed to a motor driven shaft on a substantially vertical rotary axis; said blade assembly having a corresponding rotary axis and blade assembly comprising at least one rigid metal layer; fabric layers; and resilient rubber-like layers of material bonded to and securing said fabric layers and said metal layer together; said metal layer being encapsulated between said fabric layers and said layers of rubber-like material; said metal layer having opposite ends terminating in spaced relation to said opposite ends of said blade assembly and corresponding opposite ends of said fabric and rubberlike layers.

2. The invention as defined in claim 1 wherein said middle portion of said assembly is provided with said shaft receiving opening therethrough for receiving a motor driven shaft therein on said rotary axis; and means on said assembly adapted to prevent rotation of said blade assembly around said shaft and relative thereto.

3. The invention as defined in claim 2 wherein said opening comprises a plurality of concentric and varying in diameter knock out portions adapted to fit shafts of various diameters.

4. The invention as defined in claim 1 wherein said blade assembly is provided with portions extending beyond the ends of said metal layer; said last mentioned portions being provided with upper and lower surfaces disposed at angles of less than 90° to said rotary axis.

5. The invention as defined in claim 1 wherein said metal member is made of carburized steel having a brittle character adapted to break and to allow said blade assembly to fold when the assembly hits an object of substantial size and rigidity.

6. The invention as defined in claim 1 wherein said blade assembly is provided with drive member receiving openings spaced from said shaft receiving opening and thereby adapted to prevent rotation of said blade assembly relative to a shaft on which it is mounted.

7. A method for producing a safety blade for rotary lawn mowers comprising preparing a substantially metal layer having opposite ends; laying rubber-like bonding layers at opposite sides of said metal layer and applying alternate fabric and rubber-like bonding layers to said rubber-like bonding layer with portions of said fabric and rubber-like layers extending beyond said opposite ends of said metal layer and placing said metal layer, all of said fabric layers and all of said rubber-like layers in a mold in the foregoing disposition; then applying heat and pressure by said mold for compacting and vulcanizing all of said layers together in securely bonded relation to each other thereby forming a safety blade assembly for lawn mowers.

8. A method for producing a safety blade for rotary lawn mowers comprising preparing a substantially rigid metal layer having opposite ends; laying rubber-like bonding layers at opposite sides of said layer and applying alternate fabric and rubber-like bonding layers to said rubber-like bonding layer with portions of the fabric and rubber-like layers extending beyond said opposite ends of said metal layer; placing additional fabric layers and corresponding rubber-like bonding layers in overlapping relation to said ends of said metal layer and disposing said additional fabric layers so as to extend beyond the ends of said metal layer towards said opposite ends of said blade assembly; and placing said metal layer, all of said fabric layers and all of said rubber-like layers in a mold in the foregoing disposition; then applying heat and pressure by said mold for compacting and vulcanizing all of said layers together in securely bonded relation to each other thereby forming a safety blade for rotary lawn mowers.

9. The invention as defined in claim 8 comprising the molding of an opening in the middle of said blade assembly with a plurality of varying diameter knock out portions for fitting various shafts of various diameters.

* * * * *